Feb. 16, 1926.

J. BIERMANNS ET AL.

PROTECTIVE SYSTEM

Filed Oct. 17, 1924

Inventors:
Josef Biermanns,
Otto Mayr,
by
Their Attorney

Patented Feb. 16, 1926.

1,573,622

UNITED STATES PATENT OFFICE.

JOSEF BIERMANNS AND OTTO MAYR, OF KARLSHORST, GERMANY, ASSIGNORS TO GENERAL ELECTRIC COMPANY, A CORPORATION OF NEW YORK.

PROTECTIVE SYSTEM.

Application filed October 17, 1924. Serial No. 744,197.

*To all whom it may concern:*

Be it known that we, JOSEF BIERMANNS and OTTO MAYR, citizens of Germany, residing at Karlshorst, Germany, have invented certain new and useful Improvements in Protective Systems, of which the following is a specification.

Our invention relates to improvements in protective systems for alternating electric current circuits, and more particularly to improvements in protective systems involving the use of relays in which current and potential windings cooperate to provide a discriminating action dependent on the distance between the point of fault and the relay location or on the direction of the flow of power at the relay location and an object of our invention is to provide a protective system having improved operating characteristics.

In protective systems involving the use of relays which have cooperating current and potential windings and which are to function in conformance with over-current and under-voltage with a time action dependent substantially directly on the potential and inversely on the current, it is essential to the desired discriminating action that the potential used be that most affected by the faulty condition. In protective systems involving directional relays which have cooperating current and potential windings and which are to function in conformance with the direction of power, it is essential to the desired operation that the potential used be that least affected by the faulty condition.

It is, therefore, an object of our invention to provide an improved protective system wherein relays whose discriminating action is dependent on current and potential can be energized selectively in accordance with the potential best adapted to insure the desired discriminating action. Inasmuch as relays involving cooperating current and potential windings for the functions set forth are relatively expensive in comparison with simple over-current or under-voltage relays, it is also an object of our invention to provide an improved protective system for a polyphase circuit wherein the number of relays having cooperating current and potential windings is substantially reduced.

Our invention will be better understood from the following description taken in connection with the accompanying drawings and its scope will be pointed out in the appended claims.

Figure 1:
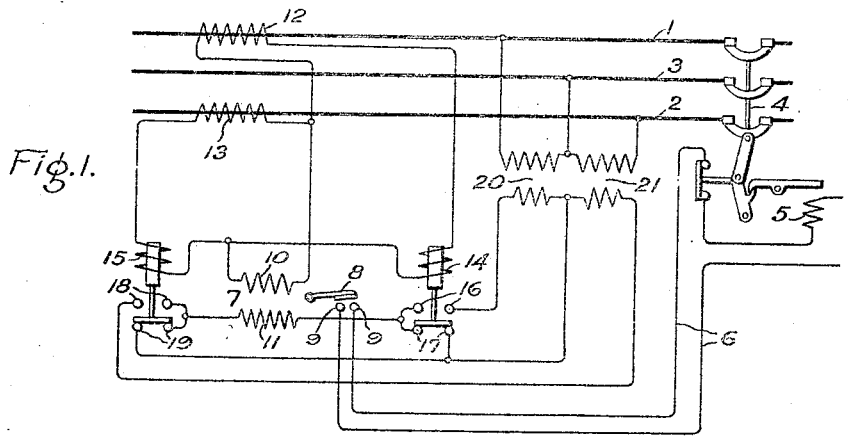
Figure 6:
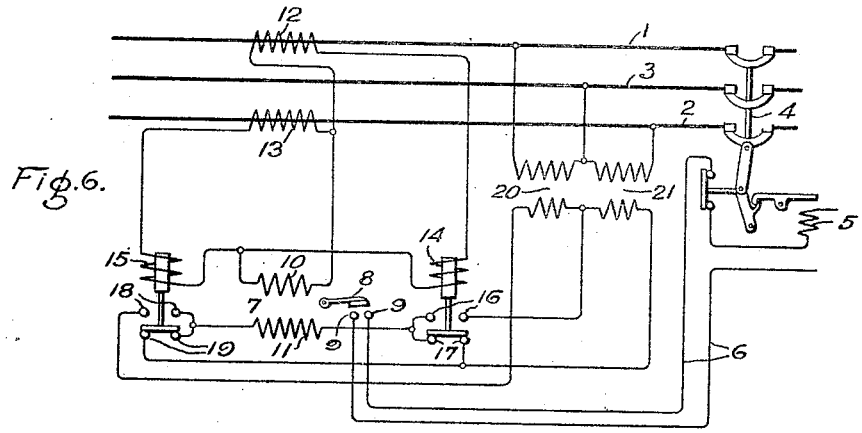
Figure 7:
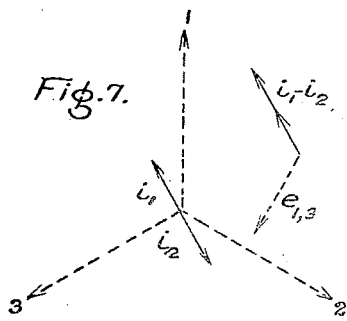
Figure 8:
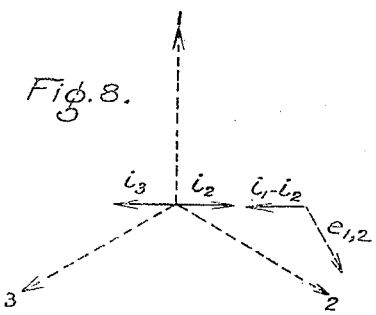
Figure 9:
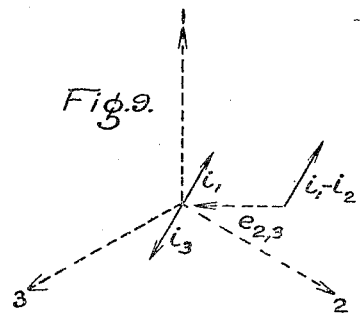
Figure 10:
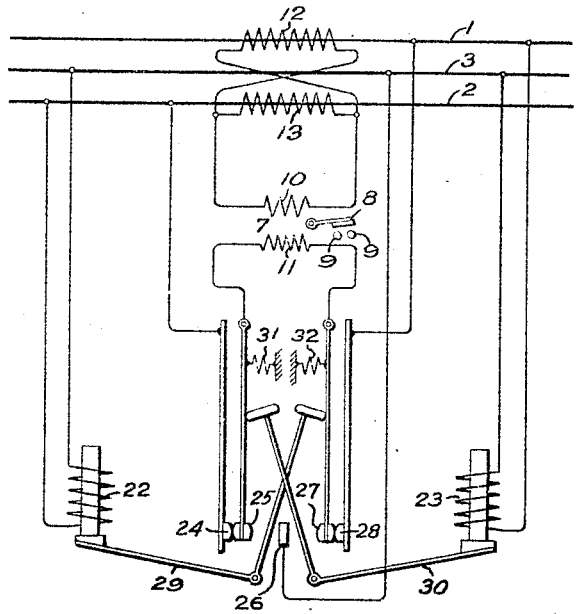
Figure 11:
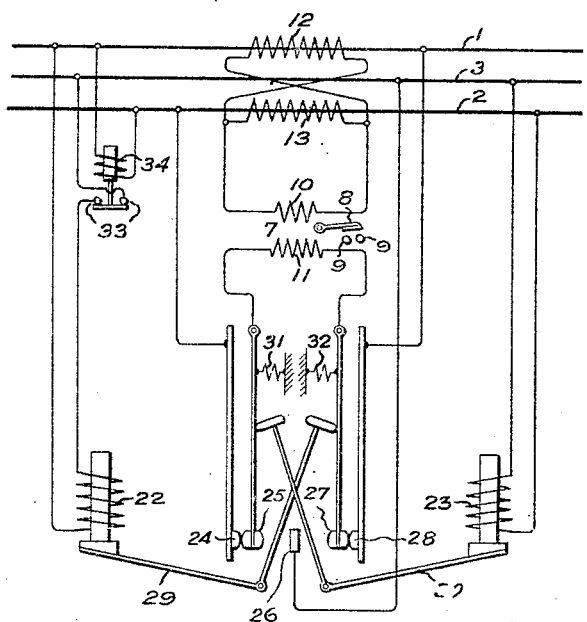

In the accompanying drawings, Fig. 1 illustrates diagrammatically an embodiment of our invention, Figs. 2 to 5 inclusive, are vector diagrams explanatory of the embodiment of our invention shown in Fig. 1; Fig. 6 illustrates diagrammatically another embodiment of our invention; Figs. 7 to 9, inclusive, are vector diagrams explanatory of the embodiment of our invention shown in Fig. 6, and Figs. 10 and 11 illustrate diagrammatically modifications of our invention.

Referring now to Figs. 1 and 6, a polyphase circuit comprising conductors 1, 2 and 3 is arranged to be controlled by suitable circuit interrupting means, such as a circuit breaker 4 which is shown as the latched closed type and is arranged to be controlled for opening by a trip coil 5 connected in a control circuit 6. For controlling the control circuit 6 in response to abnormal conditions on the circuit 1, 2, 3, there is provided an electro-responsive device, such as a relay 7 comprising relatively movable cooperating contacts 8 and 9 and cooperating current and potential windings 10 and 11 respectively for controlling the movement of the contacts. The current winding 10 is shown connected in series relation with the circuit 1, 2, 3 through current transformers 12 and 13 so as to be energized in accordance with the difference between the currents in two of the conductors such as 1 and 2. The potential winding 11 may normally be deenergized and for selectively connecting the potential winding 11 for energization in accordance with the potential of any phase of the circuit 1, 2, 3 dependent upon the phase at fault, electro-responsive means, such as over-current relays 14 and 15 arranged to be energized respectively in accordance with the currents in the two conductors 1 and 2 are provided. For example, the winding of relay 14 is connected in circuit with the secondary winding of the current transformer 12 so as to be energized in accordance with the current in the conductor 1 and the winding of relay 15 is connected in circuit with the secondary winding of the current transformer 13 so as to be energized in accordance with the current in the conductor 2. The relays 14 and 15 are arranged to control contacts 16 and 17, and 18 and 19 respectively in the circuits of the secondary windings of potential transformers 20 and 21 so that upon the occurrence of a fault the potential winding 11 of relay 7 will be energized by the desired potential.

Referring now more in particular to Fig. 1, the relay 7 may be of the type which functions under abnormal circuit conditions with a time action dependent substantially directly on the potential and inversely on the current so that the relay nearest the fault will operate the quickest. With relays of this type, examples of which are well known to the art, it is essential to the desired discriminating action that the potential winding 11 be energized upon the occurrence of a fault by the potential most affected by the fault. With the arrangement shown in Fig. 1, it will be clear from the vector diagrams of Figs. 2 to 5, inclusive, that for any phase fault on the circuit 1, 2, 3 the potential coil 11 of relay 7 is connected to be energized by the potential most affected.

Figure 2:
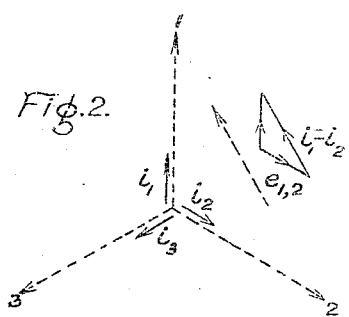
Figure 3:
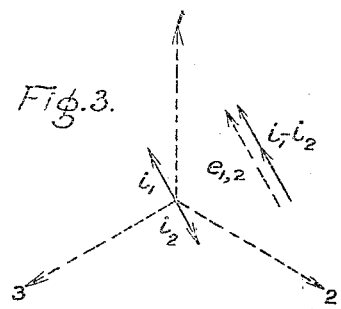
Figure 4:
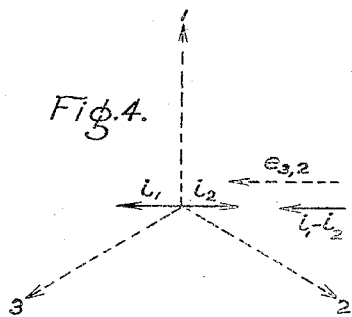
Figure 5:
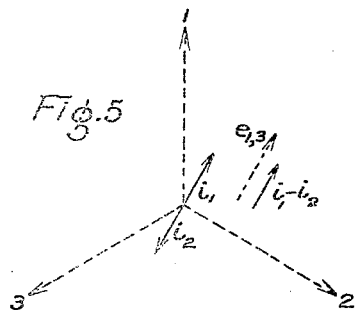

Assuming, for example, a fault between all phases, shown vectorially in Fig. 2, both of the relays 14 and 15 will be energized thus closing contacts 16 and 18, respectively. This connects the potential winding 11 for energization in accordance with the potential of phase 1, 2, this potential being substantially in phase with the difference between the currents $i_1$ and $i_2$ in the conductors 1 and 2. Assuming a fault between conductors 1 and 2, shown vectorially in Fig. 3, both of the relays 14 and 15 will be energized thus closing contacts 16 and 18, respectively, and connecting the potential winding 11 for energization in accordance with the potential of phase 1, 2, this being the potential most affected. In this case, the difference between the currents $i_1$ and $i_2$ is equal to their arithmetical sum since they are displaced 180° in phase relationship. Assuming a fault between conductors 2 and 3, shown vectorially in Fig. 4, only relay 15 will be energized. This will close contacts 18, thereby connecting the potential winding 11 for energization in accordance with the potential of phase 2, 3, this being the potential most affected. Assuming a fault between conductors 1 and 3, shown vectorially in Fig. 5, only relay 14 will be energized. This will close contacts 16, thereby connecting the potential winding 11 for energization in accordance with the potential difference between the faulty conductors 1 and 3, this being the potential most affected by the fault. In the last two cases, there is no fault current in the conductor not at fault, that is to say, 1 and 2 respectively and consequently the fault current flowing in the current winding 10 of relay 7 is equal to that flowing in conductors 2 or 1 respectively. In each case, however, the potential winding 11 is connected to be energized by the potential difference between the two faulty conductors and in phase with the current in the current winding 10.

Referring now more in particular to Fig. 6, the relay 7 may be of the type which functions in conformance with the direction of power on the circuit 1, 2, 3. With relays of this type, examples of which are well known to the art, it is essential in order to insure the requisite operating force for the relay that the potential winding 11 be connected to the potential least affected upon the occurrence of a fault causing a change in the direction of power flow. With the arrangement shown in Fig. 6, it will be clear from the vector diagrams of Figs. 7 to 9, inclusive, that for any phase fault on the circuit 1, 2, 3, the potential winding 11 of relay 7 is connected to be energized by the potential least affected.

Assuming now a phase fault between conductors 1 and 2, shown vectorially in Fig. 7, both relays 14 and 15 will be energized thus closing contacts 16 and 18 respectively. This connects the potential winding 11 of relay 7 for energization in accordance with the potential of phase 1, 3 which is substantially 120° out of phase with the difference between the currents in conductors 1 and 2. Since conductor 3 is not at fault, the potential of phase 1, 3 is that least affected. Assuming a phase fault between conductors 2 and 3, shown vectorially in Fig. 8, only relay 15 will be energized. This will close contacts 18, thereby connecting the potential winding 11 for energization in accordance with the potential of phase 1, 2. Similarly, for a phase fault between conductors 1 and 3, shown vectorially in Fig. 9, only relay 14 will be energized. This will close contacts 16, thereby connecting the potential winding 11 for energization in accordance with the potential of phase 2, 3. Thus, in each case, the potential winding 11 is connected to be energized by the potential between a conductor at fault and one not at fault so that there is a substantial potential difference on the winding 11 to produce a strong operating effect in conjunction with the cooperating current winding 10.

Figs. 10 and 11 illustrate modifications of the embodiments of our invention shown in Figs. 1 and 6 respectively. In these modifications, the electroresponsive means employed selectively to effect the energization of the potential winding 11 of the relay 7 are under-voltage relays 22 and 23 respectively. In Figs. 10 and 11, the potential connections are made direct without the medium of potential transformers and the circuit breaker and control circuit are also omitted for the sake of clearness.

The relays 22 and 23 are arranged to control relatively movable cooperating contacts 24, 25, 26, 27 and 28 through circuit controlling members 29 and 30 arranged for movement by the armatures of the relays. The contacts 24, 26 and 28 are stationary and the contacts 25 and 27 are movable and are arranged to be biased toward the stationary contact 26 by suitable means such as springs 31 and 32 respectively. Each of the movable contacts 25 and 27 is also arranged to be controlled by each of the contact controlling members 29 and 30.

Referring now to Fig. 10, the relay 7 is of the type having a discriminating time action dependent on the current and potential as described in connection with the embodiment of our invention shown in Fig. 1. Under normal conditions of current and potential both of the contact controlling members 29 and 30 will be in the position shown. In this case, the potential winding 11 is connected across conductors 1 and 2. If, now, there is a fault between these conductors, neither of the relays 22 and 23 will drop out since they are energized by the potentials across phases 2, 3 and 1, 3 respectively. Therefore, the potential winding 11 remains energized by the potential of phase 1, 2, that is, the phase at fault. Assuming a fault between conductors 2 and 3, then the potential across these conductors will fall sufficiently to permit relay 22 to drop out. Consequently, the contact controlling member 29 will no longer be restrained in the position shown and the contact 27 will be free to move under the bias of the spring 32 to engage the contact 26, thereby connecting the potential winding 11 across the faulty conductors 2 and 3. Similarly, for a fault between conductors 1 and 3, the potential winding will be connected across these conductors. Thus, in every case the potential winding 11 is connected to the potential most affected by the fault.

Referring now to Fig. 11, the relay 7 is of the power directional type as described in connection with the embodiment of our invention shown in Fig. 6. Under normal conditions, the parts are in position as shown in Fig. 11, the potential winding 11 being connected across conductors 1, 2. Assuming a fault between conductors 1 and 2, such that a reversal of power takes place then since the potentials 1, 3 and 2, 3 do not decrease sufficiently to cause the relays 22 and 23 to drop out the potential winding 11 would remain energized by the potential most affected by the fault which is not desirable in the case of a power directional relay. Therefore, in the circuit of one of the relays 22, 23 contacts 33 are arranged to be controlled by an under-voltage relay 34 having its winding connected across conductors 1, 2. Consequently, upon the fall in potential across these conductors, the relay 34 drops out and opens the circuit of relay 22. This relay being thus deenergized drops out and permits the movable contact 27 under the bias of spring 32 to engage the fixed contact 26. In this way the potential winding 11 is connected across the conductors 2, 3 and is, therefore, energized by a potential least affected by the fault. Assuming a fault between conductors 1, 3, the relay 22 will drop out because of the fall in potential across the conductors 1, 3 and the potential winding 11 will be connected across the conductors 2, 3. Similarly, for a fault between conductors 2, 3, the potential winding will be connected across conductors 1, 3. Thus, in each case the potential winding 11 is connected to be energized in accordance with a potential other than that between the faulty conductors so that in conjunction with the cooperating current winding 10 a strong operating force is assured.

In Figs. 1, 6, 10 and 11, it is obvious that only one of the relays 7 is employed and that this relay insures protection for faults between phases and faults to ground unless the latter occur on conductor 3. The number of relatively expensive relays is, therefore, reduced to a minimum while the overcurrent relays 14 and 15 or the under-voltage relays 22, 23 and 34 employed are relatively inexpensive.

While we have shown and described several embodiments of our invention, we do not desire to be limited to the exact arrangements shown and described but seek to cover in the appended claims all those modifications that fall within the true spirit and scope of our invention.

What we claim as new and desire to secure by Letters Patent of the United States, is:—

1. A protective system for an electric circuit comprising a relay having a current winding and a potential winding, and relay means operative in response to an abnormal condition on said circuit selectively to effect the energization of said potential winding in accordance with the potential difference between two of the conductors of said circuit.

2. In a protective system for a polyphase circuit, a relay comprising a current winding and a potential winding, means for controlling the energization of said current winding in accordance with the current in a faulty conductor of said circuit, and means responsive to the electrical condition of said circuit for selectively connecting said potential winding for energization in accordance with the potential of any phase of said circuit dependent upon the phase at fault.

3. A protective system for an electric circuit comprising a relay having a current winding connected to be energized in accordance with the difference between the currents in two of the conductors of said circuit and a potential winding, and relay means operative in response to an abnormal condition on said circuit selectively to effect the energization of said potential winding in accordance with the potential difference between two of the conductors of said circuit.

4. A protective system for an alternating electric current circuit comprising a relay having a current winding connected to be energized in accordance with the difference between the currents in two of the conductors of said circuit and a normally deenergized potential winding, and relay means operative in response to an abnormal condition on said circuit selectively to effect the energization of said potential winding in accordance with the potential difference between two of the conductors of said circuit.

5. A protective system for a polyphase circuit comprising a relay having a current winding connected in series relation with said circuit and a potential winding, and a plurality of over-current relays connected to be energized respectively in accordance with the currents in the conductors of said circuit and operative in response to a fault between phases on said circuit selectively to connect said potential winding for energization in accordance with the potential of any phase of said circuit dependent upon the phase at fault.

6. A protective system for a polyphase circuit comprising a relay having a current winding connected to be energized in accordance with the difference between the currents in two of the conductors of said circuit and a potential winding, and a plurality of relays connected to be energized respectively in accordance with the currents in said two conductors and operative in response to a fault between any two of the conductors of said circuit selectively to effect the energization of said potential winding in accordance with the potential difference between the faulty conductors.

7. A protective system for a three-phase alternating electric current circuit comprising a relay having a current winding connected to be energized in accordance with the difference between the currents in two of the conductors of said circuit and a normally deenergized potential winding, and a plurality of over-current relays connected to be energized respectively in accordance with the currents in said two conductors and operative in response to a fault between two of the conductors of said circuit selectively to effect the energization of said potential winding in accordance with the potential difference between the faulty conductors.

8. A protective system for a polyphase electric circuit comprising a relay having cooperating current and potential windings, and means operative in response to an abnormal condition on said circuit selectively to connect said potential winding for energization in accordance with the potential most affected by the abnormal condition.

9. A protective system for an electric circuit comprising a relay having cooperating current and potential windings, and a plurality of overcurrent relays connected to be energized respectively in accordance with the currents in a plurality of the conductors of said circuit operative in response to current above a predetermined value selectively to connect said potential winding for energization in accordance with the potential most affected by a fault.

10. A protective system for a polyphase alternating current circuit comprising a relay having a current winding connected to be energized in accordance with the difference between the currents in two of the conductors of the circuit and a cooperating potential winding, and a plurality of relays connected to be energized respectively in accordance with the currents in said two conductors and operative in response to a fault between any two of the conductors of the circuit selectively to connect said potential winding for energization in accordance with the potential of the circuit substantially in phase with the current in said current winding.

In witness whereof, we have hereunto set our hands this 1st day of October 1924.

JOSEF BIERMANNS.
OTTO MAYR.